United States Patent [19]
Calvani et al.

[11] Patent Number: 5,448,660
[45] Date of Patent: Sep. 5, 1995

[54] WAVELENGTH SELECTIVE OPTICAL SWITCH

[75] Inventors: Riccardo Calvani, Pino Torinese; Emilio Vezzoni, Turin, both of Italy

[73] Assignee: CSELT - Centro Studi e Laboratori Telecomunicazioni S.p.A., Turin, Italy

[21] Appl. No.: 271,016
[22] Filed: Jul. 6, 1994

[30] Foreign Application Priority Data

Aug. 10, 1993 [IT] Italy .................. TO93A0601

[51] Int. Cl.$^6$ ............................. G02B 6/28
[52] U.S. Cl. ........................... 385/21; 385/16; 385/17; 385/20
[58] Field of Search .......... 385/15, 16, 17, 20, 385/21; 359/124

[56] References Cited

U.S. PATENT DOCUMENTS

| | | | |
|---|---|---|---|
| 5,175,777 | 12/1992 | Böttle | 385/17 |
| 5,231,529 | 7/1993 | Kaede | 359/124 |
| 5,321,774 | 6/1994 | Barnard et al. | 385/16 |

FOREIGN PATENT DOCUMENTS 0361368 4/1990 European Pat. Off. .

OTHER PUBLICATIONS

Multi/Demultiplexer Using a 4–Port Optical Circulator, M. Koga et al.
An Optical FDM-Add/Drop Multiplexing Ring Network, K. Oda et al Jul. 1993.
Wavelength-Division-Multiplexing Add/Drop Multiplexer, M. Fukutoku et al.
OFC/100C'93, 1993 Technical Digest Series, vol. 4, Conference Edition (No month Available).

*Primary Examiner*—Rodney B. Bovernick
*Assistant Examiner*—Yisun Song
*Attorney, Agent, or Firm*—Herbert Dubno

[57] ABSTRACT

The device includes a first and a second optical circulator (C1, C2) having an input port and an output port that are the inputs and the outputs of the switch, as well as an optical bandpass filter (FP) placed between the two circulators (C1, C2) and connected with means for switching its state so that the filter either reflects or transmits a given wavelength, thus allowing a carrier with this wavelength at the input port of one of the circulators (C1, C2) to reach the output port of the same circulator or the output port of the other circulator.

5 Claims, 2 Drawing Sheets

WAVELENGTH SELECTIVE OPTICAL SWITCH

FIELD OF THE INVENTION

The present invention relates to optical switching devices and, more particularly, to a two-by-two, wavelength selective optical switch.

BACKGROUND OF THE INVENTION

Wavelength selective optical switches can be used, for example, in routing nodes of a wavelength division multiplex network, i.e., a network in which information associated with to various communications or groups of communications modulates separate carriers spaced apart by tens of nanometers to tenths of nanometer, depending on the requirements and the technologies used. For such applications, wavelength selectivity is necessary, so that the various carriers can be routed along different paths. Independence from polarization is also desirable, so that polarization state control systems need not be introduced and attenuation will not vary with the polarization state. On the other hand, the switching speed need not be very high, response times of the order of some milliseconds being sufficient.

A polarization independent switching element particularly suited for low switching speed applications is described by A. C. Boucouvalas and G. Georgiou in the paper "Fibre-optic interferometric tunable switch using the thermo-optic effect", Electronics Letters, Vol. 21, No. 11, May 23, 1985. The switch consists of an optical fiber Mach-Zehnder interferometer, in which the optical length of one of the two branches can be varied through a heating electrode applied to a thin film connected to the fiber in the branch. By applying adequate voltages to the electrode, the power associated with an optical input signal is split as desired between the two outputs.

Thermo-optical switches based on the same principle can be used to form switching matrices with several inputs and outputs, as described in the paper "Silica-based optical-matrix switch with intersecting Mach-Zehnder waveguides for larger fabrication tolerances" by M. Kawachi et al, Conference OFC/IOOC '93, Feb. 21-26, 1993, San José, Calif, (U.S.A.), paper TuH4.

The behavior of thermo-optical switches, however, is substantially independent of wavelength. Therefore, they must be coupled to optical bandpass filters for wavelength selective routing.

The lack of selectivity is also typical of waveguide switches using electro-optical effects or semiconductor amplifiers as optical ports; moreover, such switches are markedly polarization dependent.

OBJECT OF THE INVENTION

It is an object of this invention to provide a highly selective switch that can also be used in wavelength-division multiplex transmission systems having very closely spaced channels.

SUMMARY OF THE INVENTION

The switch according to the invention includes:
a first three-port optical circulator, with an input port and an output port respectively being a first input and a first output of the switch;
a second three-port optical circulator, with an input port and an output port respectively being a second input and a second output of the switch; and
a wavelength-tunable optical bandpass filter, connected between an input-output port of the first circulator and an input-output port of the second circulator, and associated with means for switching it to either of two possible states in which it respectively reflects or transmits a given wavelength, so that a carrier with this wavelength arriving at the input port of one of the circulators is transferred to the output port of the same circulator (straight state) or to the output port of the other circulator (crossed state).

Advantageously, the filter is a resonant cavity optical-fiber filter, associated with means for adjusting the cavity length for state switching and wavelength tuning.

BRIEF DESCRIPTION OF THE DRAWING

The present invention will be made clearer with reference to the annexed drawing, in which.

SPECIFIC DESCRIPTION

Figure 1:
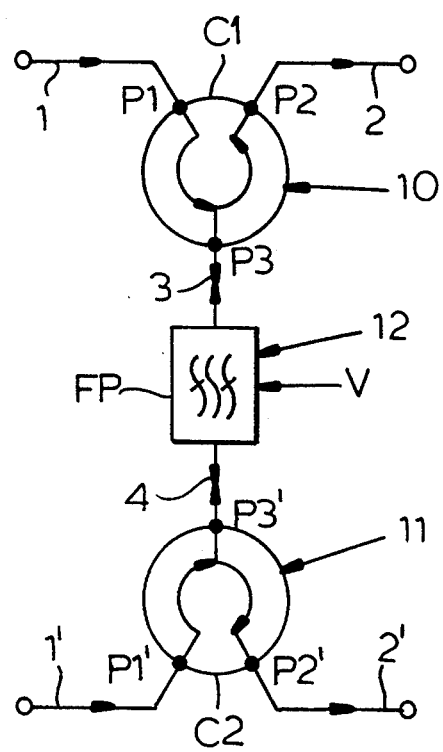
FIG. 1 is a diagram of the optical switch according to the invention.

As it can be seen from FIG. 1, the device has a pair of circulators, C1 and C2, represented at 10 and 11, implemented in micro-optics, and a bandpass filter 12, FP, connected between the two circulators 10, 11.

Circulators C1, C2 (10, 11) are three-port devices having a one-way input port, a one-way output port and a two-way input-output port. Input ports P1, P1' are the two inputs of the switch, and are respectively connected to input lines 1, 1'; output ports P2, P2' are the two outputs of the switch, and are respectively connected to output lines 2, 2'. ports P3, P3' are respectively connected to fibers 3, 4 transferring signals from circulators C1, C2 (10, 11) to filter 12 FP and vice-versa.

The bandpass filter 12 FP must have high wavelength selectivity and low attenuation and must be capable of transmitting the wavelength corresponding to the passband and rejecting all others. For example, the filter 12 FP can be a Fabry-Perot cavity resonator, in which a mirror is provided at the termination of one of the fibers 3, 4, and another on the surface of an element associated to the other fiber, said element having a size comparable to that of the cavity and practically the same refraction index as the fiber core. A voltage-controlled piezo-electric device allows shifting the element so as to vary the cavity length and thus the filter passband. The structure of a tunable Fabry-Perot filter is described for instance in the paper "A field-worthy, high performance tunable fiber Fabry-Perot filter", submitted at the Conference ECOC '90, Sep. 16–20, 1990, Amsterdam. The control voltage V of the piezo-electric device is supplied by a source capable of generating several voltage levels, each of which corresponds to a passband centered around one of the wavelengths present on input lines 1, 1'.

Both the optical circulators 10, 11 and the tunable Fabry-Perot cavity filter 12 are commercially available components.

The device works as follows. For simplicity, only one of the device inputs is considered, say, input 1, on which a certain set of wavelengths, $\lambda_1, \lambda_2 \ldots \lambda_n$, is available, and it is assumed that at a given time routing operations concern the carrier at wavelength $_i$. Depending on whether this carrier should be routed to output line 2' or 2, a control voltage V such that the resonator passband is centered on wavelength $\lambda_i$ must be applied to the piezo-electric device of the filter FP. In the first case, the Fabry-Perot cavity of the filter is transparent to a radiation at that wavelength, and carrier $\lambda_i$ passes from input 1 to output 2' through ports P1, P3 of circulator 10, C1, fiber 3, filter 12 FP, fiber 4 and ports P3', P2' of circulator 11, C2 (crossed state of the switch). In the second case, the radiation is reflected from filter 12, FP, along fiber 3 and leaves output 2 through ports P3, P2 of circulator 10 C1 (straight state of the switch).

Figure 2:
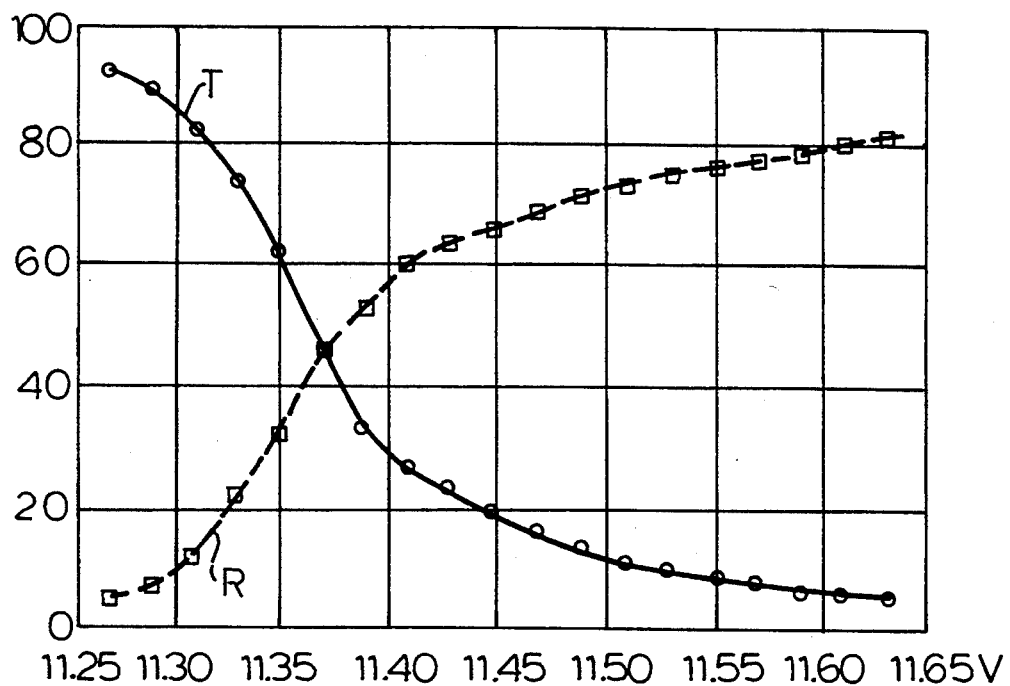
FIG. 2 is a diagram of the electro-optical characteristic of the switch.

FIG. 2 shows the characteristic of a switch according to the invention for $\lambda_i = 1548.45$ nm. In the diagram, curve T depicts the percent power outgoing from port P2' versus the voltage applied to filter 12, FP, and curve R depicts the corresponding percent power outgoing from port P2. From these curves it appears that the crossed state is obtained for V=11.25 V; if the voltage is increased to 11.65 V, the straight state is obtained in turn.

At the moment considered, the switch also presents the same straight or crossed state for a carrier at wavelength $\lambda_i$ that may be present at input 1': this carrier will then leave through output 2 (along the path: ports P1', P3' of circulator 11, C2, fiber 4, filter 12, FP, fiber 3, ports P3, P2 of circulator 10 C1) if the voltage applied is the tuning voltage of the filter, whereas otherwise it will be reflected by filter 12, FP towards port P3' of circulator 11, C2, and will reach output 2' through port P2'.

The carrier to be routed can be selected by appropriately varying the voltage V. Generally, for a given voltage, the device will be in the crossed state exclusively for a possible carrier which the filter is tuned to by that voltage, and will be in the straight state for all others.

Several devices can be connected together to make up n-by-n matrices (n>2), for instance as shown in the paper by M. Kawachi et al. Since a loss occurs in each switch, as it appears from FIG. 2, amplifiers must be introduced after a certain number of stages in the matrix, for example, active fiber or semiconductor amplifiers, to recover the signal level.

A device like the one described herein, besides being simple and easily implemented with commercially available components, has indeed a high selectivity. Preliminary evaluation of a filter having a spectral width of a few gigahertz, assuming that the reflectivity of the two cavity mirrors is essentially the same, has shown that crosstalk is negligible when adjacent channels in the wavelength division multiplex are spaced apart by a few tenths of a nanometer. Furthermore, the device behavior is independent from polarization, since each of its components is polarization independent.

Figure 3:
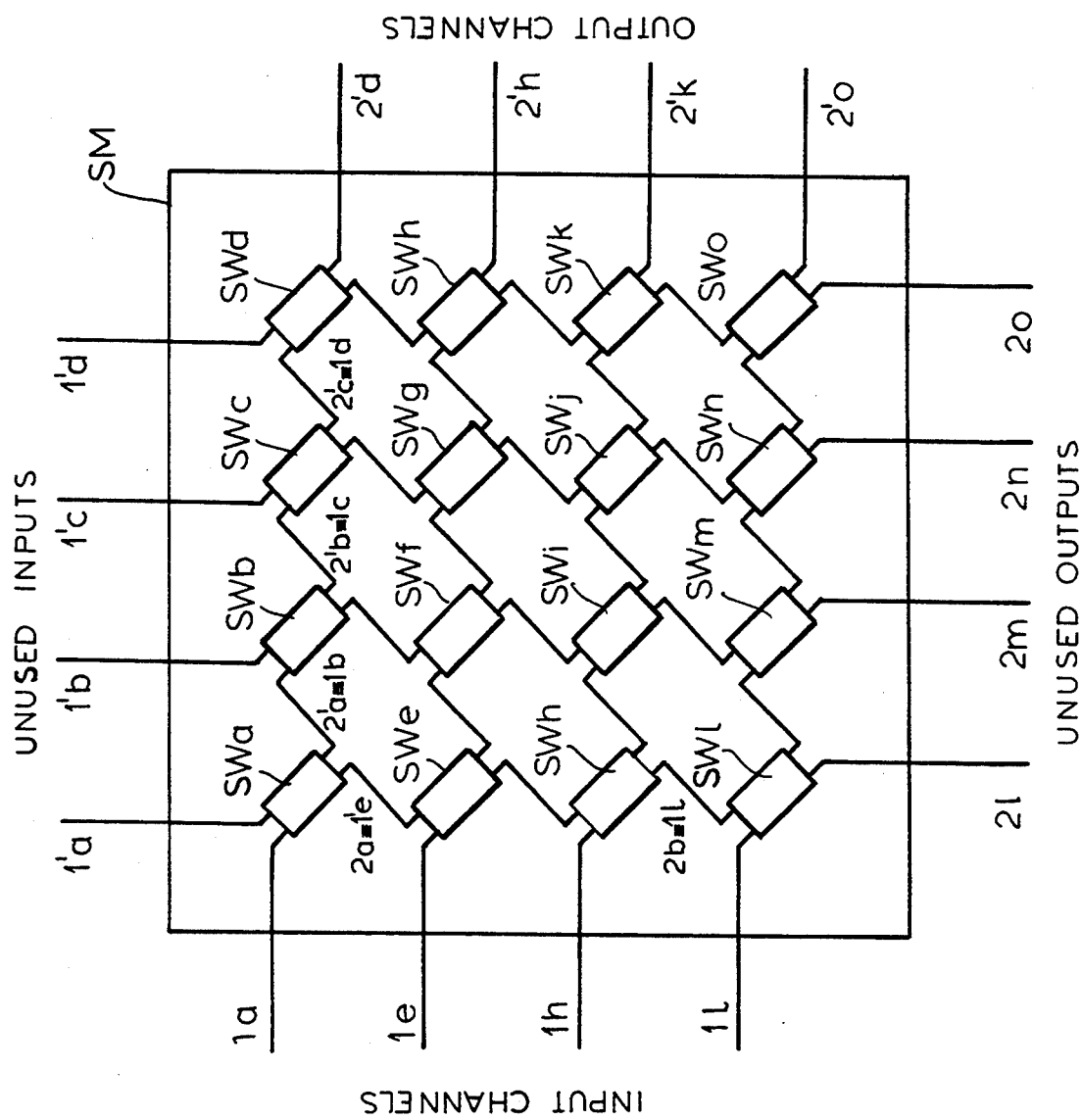
FIG. 3 is a diagram of a matrix using the optical switching elements of FIG. 1.

FIG. 3 shows a matrix of 16 elements SWa ... SWo, each identical to the two-input, two-output optical switching element of FIG. 1 to obtain to a 4×4 switching matrix SM, (n=4) and constructed in the manner described by M. Kawachi et al in the publication cited previously, with n input channel 1a, 1e, 1h, 1l, n output channels 2'd 2'h 2'k and 2'o, and n unused inputs and unused outputs as in that publication. The remaining ports have been labeled in accordance with the labeling format of FIG. 1.

We claim:

1. A two-input, two output optical switch, consisting essentially of:

a first three-port optical circulator with an input port and an output port respectively being a first input and a first output of the switch;

a second three-port optical circulator with an input port and an output port respectively being a second input and a second output of the switch; and a wavelength-tunable optical bandpass filter connected between an input-output port of the first circulator and an input-output port of the second circulator to form a Switch element therewith, and provided with means for switching the filter to either of two possible states in which it respectively reflects or transmits a given wavelength, so that a carrier with the given wavelength arriving at the input port of one of the circulators is transferred to the output port of the same circulator in straight state propagation or to the output port of the other circulator in a crossed state propagation.

2. The switch according to claim 1 wherein the means for switching the state of the filter are capable of making it reflect or transmit several wavelengths that make up a wavelength-division multiplex present at the inputs.

3. The switch according to claim 1 wherein said filter is a resonant cavity optical fiber, provided with means to adjust a cavity length thereof, controlled by a variable voltage source, for state switching and wavelength tuning.

4. The Switch according to claim 1 connected together with identical switch elements so as to form a n-input, n-output matrix.

5. A routing node for a wave-length-division multiplex optical communications network comprising a switch matrix composed of two-input, two output optical switches, each of said switches consisting essentially of:

a first three-port optical circulator with an input port and an output port respectively being a first input and a first output of the switch;

a second three-port optical circulator with an input port and an output port respectively being a second input and a second output of the switch; and a wavelength tunable optical bandpass filter connected between an input-output port of the first circulator and an input-output port of the second circulator to form a switch element therewith, and provided with means for switching the filter to either of two possible states in which it respectively reflects or transmits a given wavelength, so that a carrier with the given wavelength arriving at the input port of one of the circulators is transferred to the output port of the same circulator in propagation or to the output port of the other circulator in a crossed state propagation.

* * * * *